(12) United States Patent
Akikuni

(10) Patent No.: US 6,636,317 B2
(45) Date of Patent: Oct. 21, 2003

(54) OPTICAL INTERFEROMETER

(75) Inventor: Fumio Akikuni, Kanagawa (JP)

(73) Assignee: Ando Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/785,585

(22) Filed: Feb. 16, 2001

(65) Prior Publication Data

US 2001/0026656 A1 Oct. 4, 2001

(30) Foreign Application Priority Data

Feb. 18, 2000 (JP) ........................................ 2000-041763

(51) Int. Cl.⁷ ................................................. G01B 9/02
(52) U.S. Cl. ....................... 356/450; 356/451; 356/455; 356/498
(58) Field of Search ................................ 356/450, 451, 356/455, 498

(56) References Cited

U.S. PATENT DOCUMENTS

| | | | |
|---|---|---|---|
| 4,243,323 A | * 1/1981 | Breckinridge | 356/345 |
| 5,170,223 A | * 12/1992 | Carangelo et al. | 356/346 |
| 5,325,226 A | * 6/1994 | Khoe | 359/189 |
| 5,764,361 A | * 6/1998 | Kato et al. | 356/358 |
| 6,034,773 A | * 3/2000 | Nishimura et al. | 356/358 |
| 6,134,003 A | * 10/2000 | Tearney et al. | 356/345 |
| 6,381,015 B1 | * 4/2002 | Sonehara et al. | 356/357 |

FOREIGN PATENT DOCUMENTS

| EP | 0 480 027 A1 | 4/1992 |
|---|---|---|
| JP | 61-140802 | 6/1986 |

* cited by examiner

Primary Examiner—Robert H. Kim
Assistant Examiner—Jurie Yun
(74) Attorney, Agent, or Firm—Fish & Richardson P.C.

(57) ABSTRACT

The optical interferometer in which the incident light beam 3 is branched into 2 optical paths of the reflection light and the transmission light which cross at right angle with each other by the beam splitter 4, and on each optical path, the reflection light is totally reflected by the first reflection unit 5, and the transmission light is totally reflected by the second reflection unit 6, and the reflection lights by both reflection units 5 and 6 are wave-combined again by the beam splitter 4, and received by the light receiver 7. The beam splitter 4 by which the incident light beam is wave-separated and wave-combined, is arranged with a little inclination from the vertical to the incident light beam.

13 Claims, 2 Drawing Sheets

— OPTICAL PATH
— STAGE MOVEMENT

— OPTICAL PATH
— STAGE MOVEMENT

OPTICAL INTERFEROMETER

BACKGROUND OF THE INVENTION

1. Field of the Invention

The present invention relates to an optical interferometer which is used, for example, in the field of the optical instrumentation engineering.

2. Description of the Related Art

FIG. 3 is a view showing an outline structural example of a conventional optical interferometer. In FIG. 3, numeral 1 is an optical fiber, numeral 2 is a lens, numeral 3 is an incident light beam, numeral 4 is a beam splitter, numerals 5 and 6 are reflection units, and numeral 7 is a light receiver.

The optical interferometer converts, as shown in FIG. 3, the incident light beam 3 from the optical fiber 1 into a parallel light beam by the lens 2, and branches the parallel light beam to two optical paths of a transmission light beam and a reflection light beam which are perpendicular to each other, by the beam splitter 4, and the reflection light beams by the reflection units 5 and 6 placed in the respective optical paths at a right angle, are wave-combined again by the beam splitter 4.

At this time, when a stage, not shown, on which the reflection unit 5 is arranged, is moved at a constant speed, a difference is caused in the optical path length of the reflection light from the two reflection units 5 and 6, and a change of the intensity of interference fringes is observed.

The intensity change of the interference fringes is output by the light receiver 7 as an electric signal.

As described above, in the conventional optical interferometer, the beam splitter 4 is perpendicularly arranged to the incident optical axis, however, the light beams reflected by the incident surface and the emitting surface of the beam splitter 4 are interfered with each other, or return to the fiber 1, thereby, stable measurements are difficult.

SUMMARY OF THE INVENTION

Accordingly, an object of the present invention is to eliminate such a reflection light beam, and to provide an optical interferometer which can conduct stable measurements.

In order to solve the above problems, the invention according to a first aspect is an optical interferometer which is characterized by a structure provided with: an optical fiber in which a measured light beam is incident; a lens to convert the incident light beam from the optical fiber into a parallel light beam; a beam splitter which branches the incident light beam to two optical paths which are perpendicular to each other by a reflection light beam and a transmission light beam, and is arranged with a little inclination from the verticality to the incident light beam; a first reflection unit to reflect the light beam to a position which is moved in parallel with the reflected light beam from the beam splitter; a second reflection unit to reflect the light beam to a position which is moved in parallel with the transmitted light beam from the beam splitter; and the light receiver to receive the light wave-combined by the beam splitter.

Herein, as the reflection unit, a reflector is representative, or instead of the reflector, for example, a corner cube can be used. The light receiving unit is a unit to output the intensity change of interference fringes as an electrical signal.

As described above, according to the invention of the first aspect, because the beam splitter is not perpendicularly arranged to the incident optical axis, but arranged with the inclination, the light beam reflected on the incident surface does not pass through the same optical path as the incident optical path, and therefore, the light beam does not return to the optical fiber.

Further, the light beam reflected on an emitting surface of the beam splitter does not pass through the same optical path in the beam splitter. Accordingly, the interference in the beam splitter can be avoided and stable measurements can be conducted.

The invention according to a second aspect is the optical interferometer which is characterized by a structure provided with: an optical fiber in which a measured light beam is incident; a lens arranged at a position at which the incident optical axis is inclined by shifting the central axis of the optical fiber and the central axis of the lens; a beam splitter which branches the incident light beam to two optical paths which are perpendicular to each other by a reflection light beam and a transmission light beam; a second reflection unit to reflect the light beam to a position which is moved in parallel with the transmitted light beam from the beam splitter; and a light receiver to receive the light wave-combined by the beam splitter.

Herein, as the reflection unit, a reflector is representative, or instead of the reflector, for example, a corner cube can be used. The light receiving unit is a unit to output the intensity change of interference fringes as an electrical signal.

As described above, according to the invention of the second aspect, in the same manner as the invention according to the first aspect, because the incident optical axis is inclined, the light beam reflected on the incident surface does not pass through the same optical path as the incident optical path, therefore, the light beam does not return to the optical fiber.

Further, the light beam reflected on an emitting surface of the beam splitter does not pass through the same optical path in the beam splitter. Accordingly, the interference in the beam splitter can be avoided and the stable measurements can be conducted.

The invention according to a third aspect is the optical interferometer according to either one of the first and second aspects, and is characterized by a structure in which the first and the second reflection units are reflectors.

As described above, according the invention of the third aspect, because the first and the second reflection units are the optical interferometers, which are the reflectors, the reflection light beam from the beam splitter is reflected to a position which is moved in parallel with the reflection light beam by the first reflector, and on the one hand, the transmission light beam from the beam splitter is reflected to a position which is moved in parallel with the transmission light beam by the second reflector, and these can be incident into the beam splitter.

The invention according to a fourth aspect is the optical interferometer according to either one of the first and second aspects, and is characterized by a structure in which the first and the second reflection units are corner cubes.

As described above, according to the invention of the fourth aspect, because the first and the second reflection units are the optical interferometers, which are the corner cubes, the reflection light beam from the beam splitter is reflected to a position which is moved in parallel with the reflection light beam by the first corner cube, and on the one hand, the transmission light beam from the beam splitter is reflected to a position which is moved in parallel with the transmission light by the second corner cube, and these can be incident into the beam splitter.

The invention according to a fifth aspect is the optical interferometer according to either one of the first or second aspect, and is characterized by a structure in which the optical fiber is an obliquely polished optical fiber.

As described above, according to the invention according to the fifth aspect, because the optical fiber is the optical interferometer, which is the obliquely polished optical fiber, the reflection on the connector end of the optical fiber is suppressed, and the returning light from the lens can be decreased.

DETAILED DESCRIPTION OF THE PRESENT INVENTION

Figure 1:
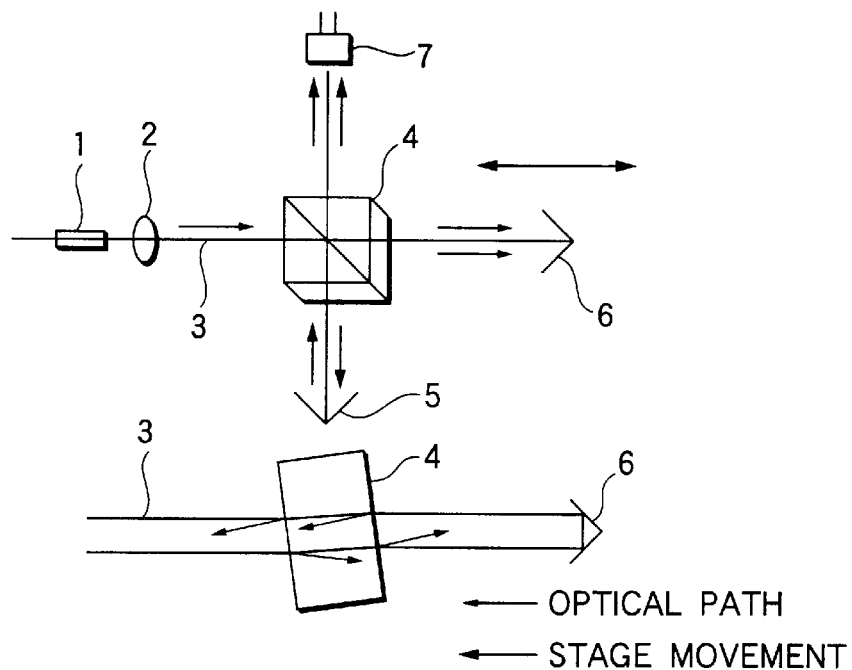
FIG. 1 is a view showing an outline structure of an optical interferometer according to a first embodiment of the invention.
Figure 2:
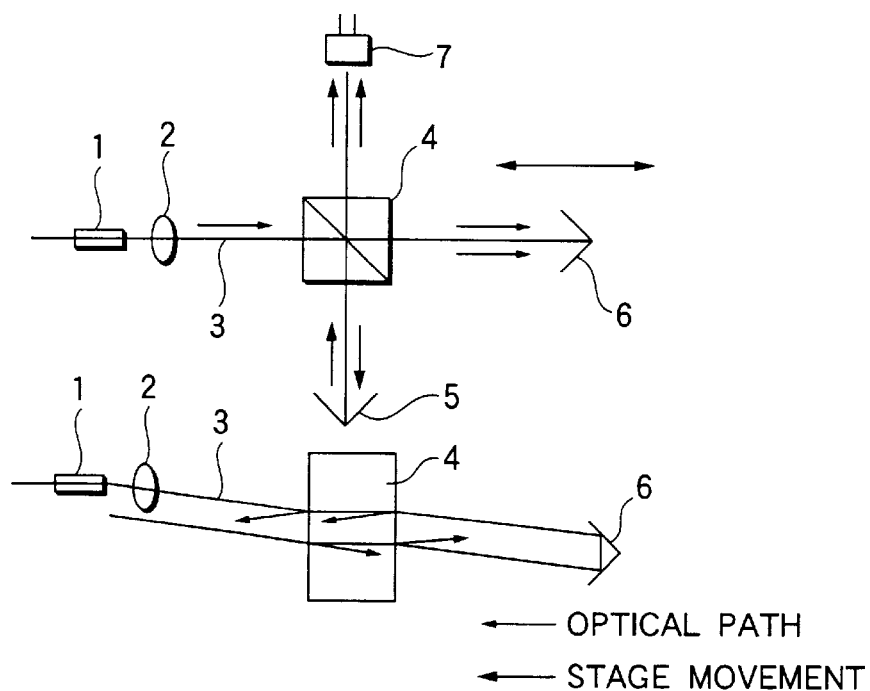
FIG. 2 is a view showing an outline structure of an optical interferometer according to a second embodiment of the present invention.

Referring to FIG. 1 and FIG. 2, embodiments of an optical interferometer according to the present invention will be described below.

First Embodiment

Figure 3:
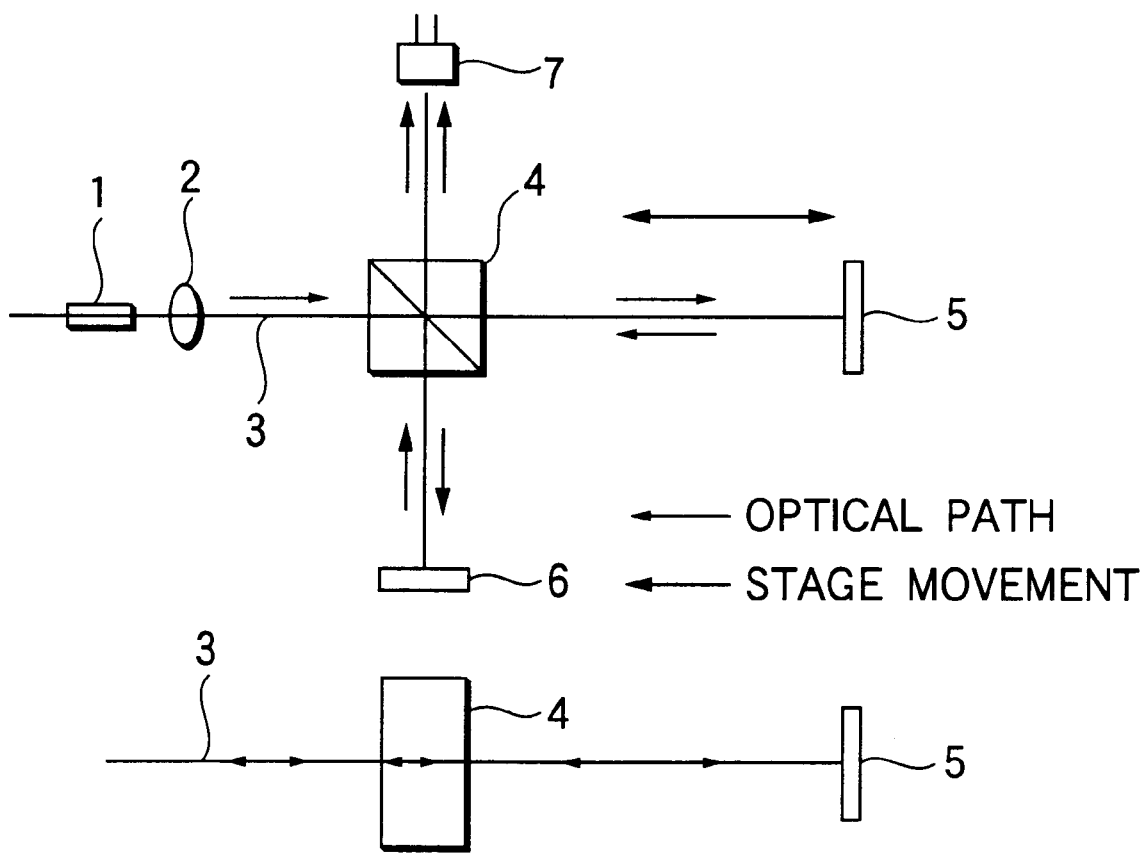
FIG. 3 is a view showing an outline structure of a conventional optical interferometer.

Initially, FIG. 1 is a view showing an outline structure of an optical interferometer according to a first embodiment of the present invention. As well as the conventional optical interferometer (refer to FIG. 3), in FIG. 1, numeral 1 is an optical fiber for outputting a light beam to be measured, numeral 2 is a lens for converting the light beam from the optical fiber into a parallel light beam as an incident light beam 3, numeral 4 is a beam splitter for branching the light beam to two optical paths perpendicular to each other to make a reflected light beam and a transmitted light beam, numeral 5 is a first reflection unit for reflecting the reflected light beam to return the reflected light beam to the beam splitter, numeral 6 is a second reflection unit for reflecting the transmitted light beam to return the transmitted light beam to the beam splitter, and numeral 7 is a light receiver for receiving the wave-combined light beam from the beam splitter 4.

The reflected light beam returned to the beam splitter is in parallel to the reflected light beam emitted from the beam splitter. Also, the transmitted light beam returned to the beam splitter is in parallel to the transmitted light beam emitted from the beam splitter. The light beams reflected by the reflecting units 5 and 6 are again combined into a wave-combined beam by the beam splitter 4 to output the light receiver 7.

The reflection unit 5 is disposed on a stage, not shown, for moving the reflection unit at a constant speed. When the stage is moved at the constant speed, a difference is caused in the optical path length of the reflection light from the two reflection units 5 and 6, and a change of the intensity of interference fringes is observed. The intensity change of the interference fringes is output by the light receiver 7 as an electric signal.

According to the first embodiment, the beam splitter 4 is arranged with inclination from a position that the light beam is introdued perpendicular to an incident surface of the beam splitter. Specifically, as shown in FIG. 1, when the incident beam is inclined by 1° with respect to a normal line of an incident surface of the beam splitter 4, the light beam reflected on the incident surface of the beam splitter 4 does not path through the same optical path as the incident light beam, and advances toward a direction inclined by 2° with respect to the incident optical path.

Herein, when the distance between the optical fiber 1 and the beam splitter 4 is 10 cm, the reflected light beam returns to a position shifted by about 3.5 mm, and the reflected light beam does not return to the optical fiber 1. Next, as for also the light beam reflected on an emitting surface of the beam splitter 4, the reflected light beam does not return through the same optical path in the beam splitter 4, and the reflected light beam does not return to the optical fiber 1. The light beam emitted from the beam splitter 4 is reflected to a position which is moved in parallel with the emitted light beam, by the reflectors 5 and 6, and is incident again into the beam splitter 4, and the wave-combined light is incident into the light receiver 6.

Althogh the inclined angle is 1° in the first embodiment, the beam splitter may be arranged in such a manner that the inclined angle of the incident beam is in a range of from 0.5° to 10° with respect to a normal line of an incident surface of the beam splitter 4. Preferably, the inclined angle is in a range of from 1° to 2°.

Second Embodiment

FIG. 2 is a view showing an outline structure of an optical interferometer according to a second embodiment of the present invention. As well as the conventional optical interferometer (refer to FIG. 3), in FIG. 2, numeral 1 is an optical fiber, numeral 2 is a lens, numeral 3 is an incident light beam, numeral 4 is a beam splitter, numerals 5 and 6 are reflectors (the first and the second reflection units), and numeral 7 is a light receiver. The elements 1–7 has the same structure as those of the first embodiment of the invention.

According to the second embodiment, central axes of the optical fiber 1 and the central axis of the lens 2 are shifted from each other. Accordingly, the incident light beam 3 which is made a parallel light beam by the lens 2, is incident not perpendicularly to the beam splitter 4, but with an angle with respect to the normal line of a incident surface of the beam splitter 4. Therefore, the same effect as in the first embodiment can be obtained.

In this connection, in the embodiments, the reflection unit is the reflector, however, the present invention is not limited to the reflector, but, instead of the reflector, the reflection unit such as a corner cube may be used.

Further, besides, it is of course that the specific dimensional relationship or the like, may be appropriately modified.

As described above, according to the optical interferometer according to the invention of the first aspect, because the beam splitter is inclined, it can be eliminated that the reflection from the incident surface of the beam splitter and the reflection from the emitting surface return to the optical fiber, and the interference in the beam splitter occurs, and the stable measurement can be conducted.

According to the optical interferometer according to the invention of the second aspect, because the incident optical axis is inclined, as in the invention according to the first aspect, the reflection on the incident surface and the emitting surface can be suppressed and the stable measurement can be conducted.

According to the optical interferometer according to the invention of the third aspect, because the first and the second reflection units are reflectors, as in the invention of the first aspect, the reflected light from the beam splitter is reflected to a position which is moved in parallel with the reflected light by the first reflector, and on the one hand, the transmission light from the beam splitter is reflected to a position which is moved in parallel with the transmission light by the second reflector, and these can be incident to the beam splitter.

According to the optical interferometer according to the invention of the fourth aspect, because the first and the second reflection units are corner cubes, the reflected light from the beam splitter is reflected to a position which is moved in parallel with the reflected light by the first corner cube, and on the one hand, the transmission light from the beam splitter is reflected to a position which is moved in parallel with the transmission light by the second corner cube, and these can be incident to the beam splitter.

According to the optical interferometer according to the invention of the fifth aspect, because the optical fiber is the obliquely polished fiber, the returning light from the connector end is suppressed, and the stable measurements can be conducted.

What is claimed is:

1. An optical interferometer comprising:
    an optical fiber for outputting a light beam to be measured;
    a lens for converting the light beam from the optical fiber into a parallel light beam;
    a beam splitter having a cube-like shape with an incident surface and a mirror surface inclined to one another, said beam splitter for branching the light beam to two optical paths perpendicular to each other to make a reflected light beam and a transmitted light beam, the beam splitter for combining the reflected light beam and the transmitted light beam to output a wave-combined light beam;
    a first reflection unit for reflecting the reflected light beam to return the reflected light beam to the beam splitter, in which the reflected light beam returned to the beam splitter is in parallel to the reflected light beam emitted from the beam splitter;
    a second reflection unit for reflecting the transmitted light beam to return the transmitted light beam to the beam splitter, in which the transmitted light beam returned to the beam splitter is in parallel to the transmitted light beam emitted from the beam splitter; and
    a light receiver for receiving the wave-combined light beam from the beam splitter,
    wherein the incident beam is inclined with respect to a normal line of the incident surface of the beam splitter and the inclined angle of the incident beam is in a range of from 0.5° to 10°.

2. An optical interferometer comprising:
    an optical fiber for outputting a light beam to be measured;
    a lens for converting the light beam from the optical fiber into a parallel light beam;
    a beam splitter having a cube-like shape with an incident surface and a mirror surface inclined to one another, said beam splitter for branching the light beam to two optical paths perpendicular to each other to make a reflected light beam and a transmitted light beam, the beam splitter for combining the reflected light beam and the transmitted light beam to output a wave-combined light beam;
    a first reflection unit for reflecting the reflected light beam to return the reflected light beam to the beam splitter, in which the reflected light beam returned to the beam splitter is in parallel to the reflected light beam emitted from the beam splitter;
    a second reflection unit for reflecting the transmitted light beam to return the transmitted light beam to the beam splitter, in which the transmitted light beam returned to the beam splitter is in parallel to the transmitted light beam emitted from the beam splitter; and
    a light receiver for receiving the wave-combined light beam from the beam splitter,
    wherein the incident beam is inclined with respect to a normal line of the incident surface of the beam splitter and the inclined angle of the incident beam is in a range of from 1° to 2°.

3. An optical interferometer comprising:
    an optical fiber for outputting a light beam to be measured;
    a lens for converting the light beam from the optical fiber into a parallel light beam;
    a beam splitter for branching the light beam to two optical paths perpendicular to each other to make a reflected light beam and a transmitted light beam, the beam splitter for combining the reflected light beam and the transmitted light beam to output a wave-combined light beam;
    a first reflection unit for reflecting the reflected light beam to return the reflected light beam to the beam splitter, in which the reflected light beam returned to the beam splitter is in parallel to the reflected light beam emitted from the beam splitter;
    a second reflection unit for reflecting the transmitted light beam to return the transmitted light beam to the beam splitter, in which the transmitted light beam returned to the beam splitter is in parallel to the transmitted light beam emitted from the beam splitter; and
    a light receiver for receiving the wave-combined light beam from the beam splitter,
    wherein the incident beam is inclined with respect to a normal line of an incident surface of the beam splitter, and
    wherein a central axis of the optical fiber is different from a central axis of the lens to incline the light beam with respect to the normal line of the incident surface of the beam splitter.

4. The optical interferometer according to claim 3 wherein the first and the second reflection units are reflectors.

5. The optical interferometer according to claim 3 wherein the first and the second reflection units are corner cubes.

6. The optical interferometer according to claim 3 wherein the optical fiber is an obliquely polished optical fiber.

7. The optical interferometer according to claim 3 wherein the inclined angle of the incident beam is in a range of from 0.5° to 10°.

8. The optical interferometer according to claim 3 wherein the inclined angle of the incident beam is in a range of from 1° to 2°.

9. An optical interferometer comprising:
    an optical fiber for outputting a light beam to be measured;
    a lens for converting the light beam from the optical fiber into a parallel light beam;

a beam splitter for branching the light beam to two optical paths perpendicular to each other to make a reflected light beam and a transmitted light beam, the beam splitter for combining the reflected light beam and the transmitted light beam to output a wave-combined light beam;

a first reflection unit for reflecting the reflected light beam to return the reflected light beam to the beam splitter, in which the reflected light beam returned to the beam splitter is in parallel to the reflected light beam emitted from the beam splitter;

a second reflection unit for reflecting the transmitted light beam to return the transmitted light beam to the beam splitter, in which the transmitted light beam returned to the beam splitter is in parallel to the transmitted light beam emitted from the beam splitter; and a light receiver for receiving the wave-combined light beam from the beam splitter, wherein the incident beam is inclined with respect to a normal line of an incident surface of the beam splitter, and wherein the inclined angle of the incident beam is in a range of from 0.5° to 10°.

10. The optical interferometer according to claim 9 wherein the first and the second reflection units are reflectors.

11. The optical interferometer according to claim 9 wherein the first and the second reflection units are corner cubes.

12. The optical interferometer according to claim 9 wherein the optical fiber is an obliquely polished optical fiber.

13. The optical interferometer according to claim 9 wherein the inclined angle of the incident beam is in a range of from 1° to 2°.

* * * * *